D. M. COOPER.
STOP MECHANISM FOR MACHINERY.
APPLICATION FILED DEC. 30, 1909.

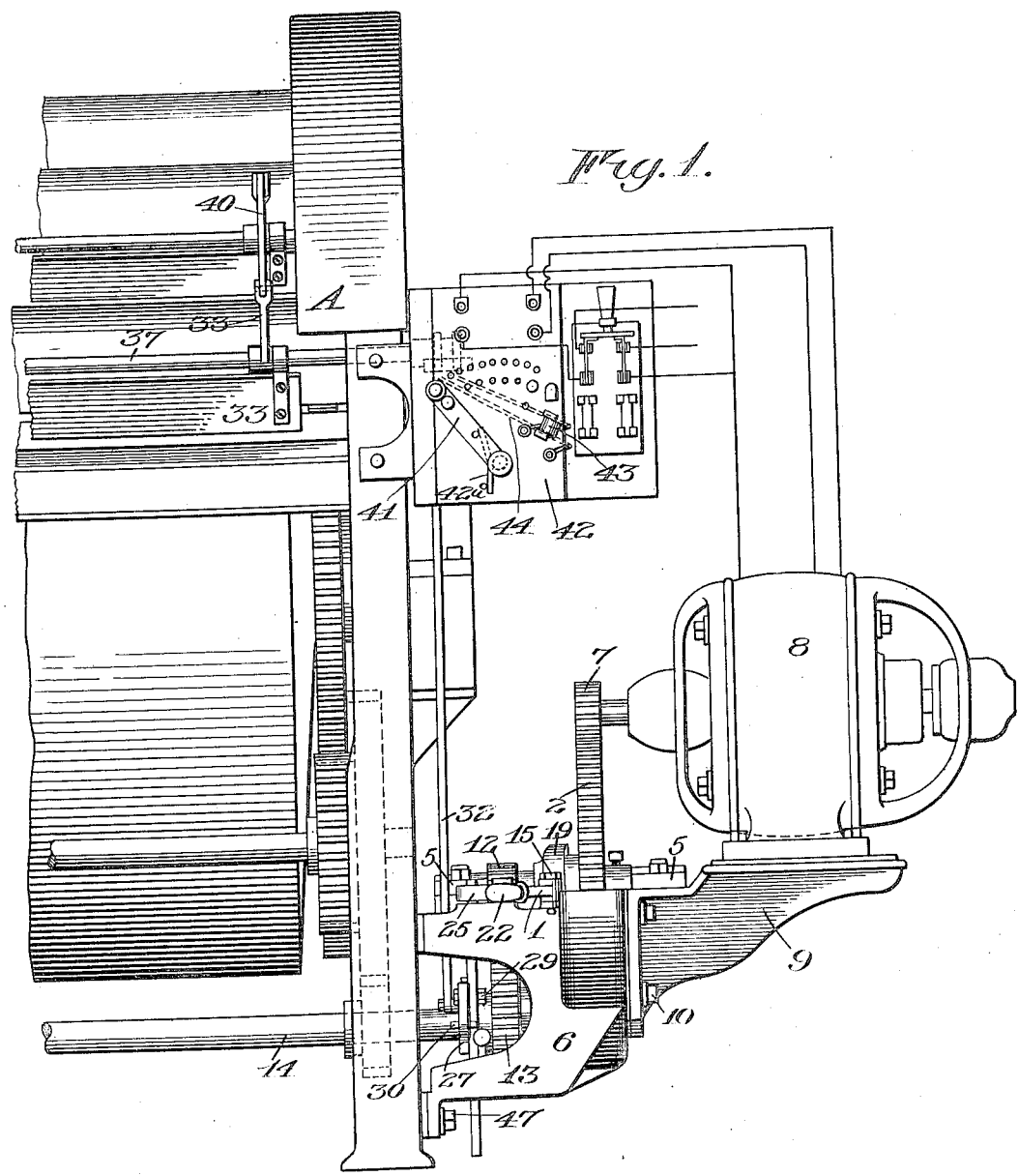

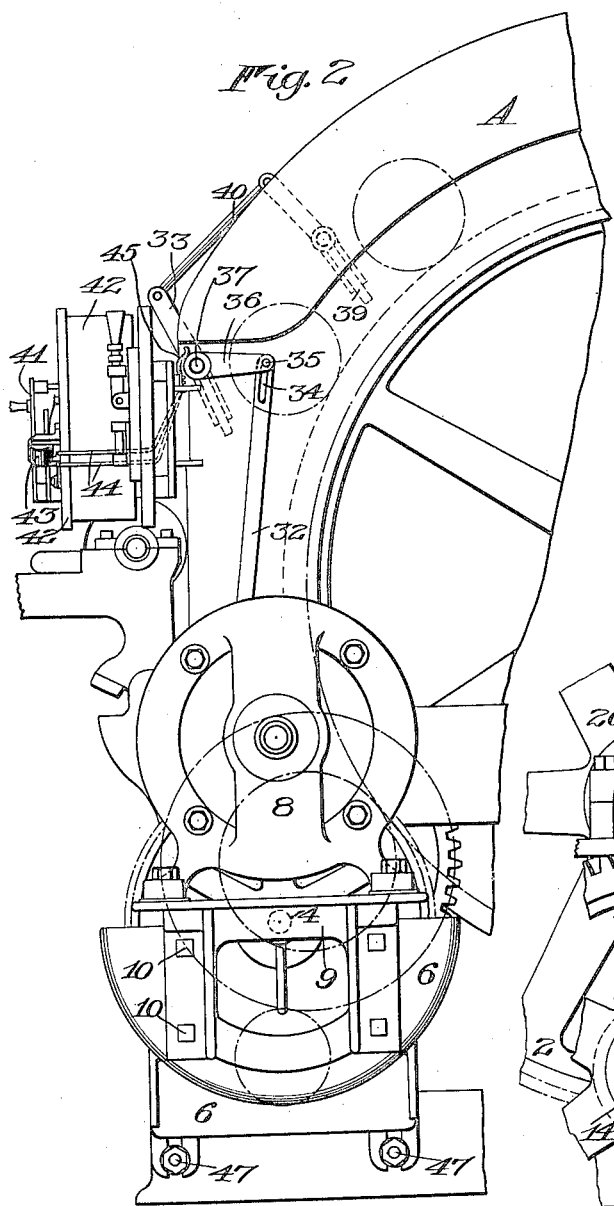
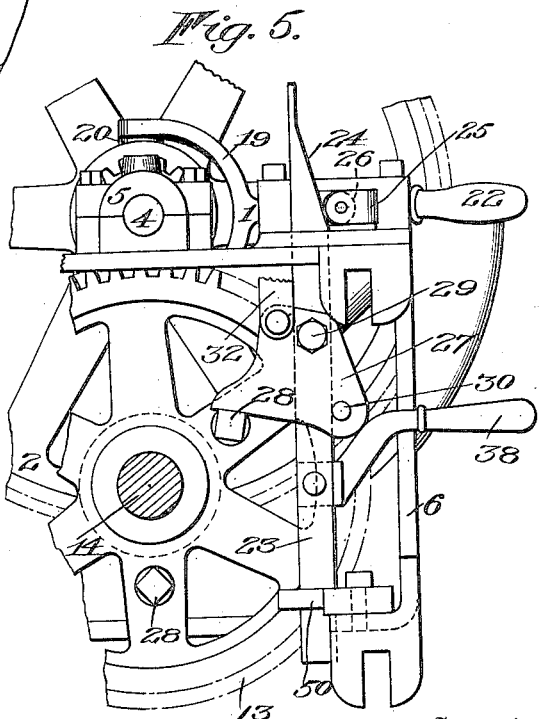
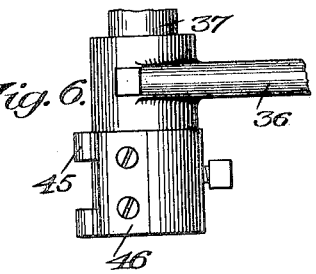
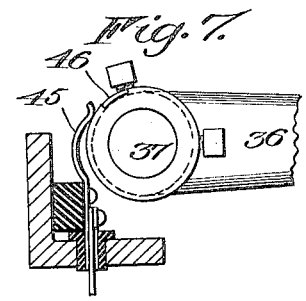

1,102,880.

Patented July 7, 1914.
3 SHEETS—SHEET 3.

Witnesses
Walter B. Payne
H. H. Simms

Inventor
Daniel M. Cooper
By Church & Rich
His Attorneys

UNITED STATES PATENT OFFICE.

DANIEL M. COOPER, OF ROCHESTER, NEW YORK, ASSIGNOR, BY MESNE ASSIGNMENTS, TO AMERICAN LAUNDRY MACHINERY COMPANY, OF CINCINNATI, OHIO, A CORPORATION OF OHIO.

STOP MECHANISM FOR MACHINERY.

1,102,880.

Specification of Letters Patent.

Patented July 7, 1914.

Application filed December 30, 1909. Serial No. 535,566.

*To all whom it may concern:*

Be it known that I, DANIEL M. COOPER, of Rochester, in the county of Monroe and State of New York, have invented certain new and useful Improvements in Stop Mechanisms for Machinery; and I do hereby declare the following to be a full, clear, and exact description of the same, reference being had to the accompanying drawings, forming a part of this specification, and to the reference-numerals marked thereon.

The present invention relates to mechanisms for automatically stopping machines whenever an abnormal condition exists in the latter, and the object thereof is to provide a construction which will be positive in its action, simple in operation and not liable to get out of order.

To these and other ends the invention consists in certain improvements and combinations of parts all as will be hereinafter more fully described, the novel features being pointed out in the claims at the end of the specification.

Figure 3:
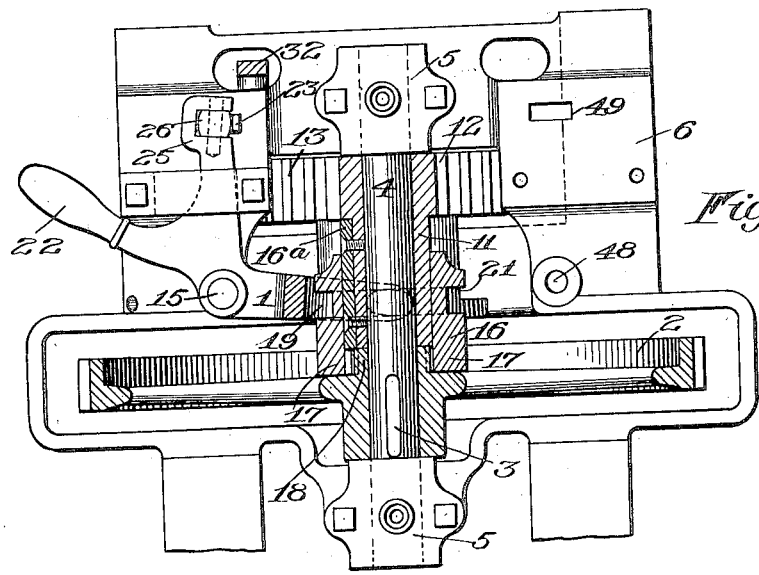
Figure 4:
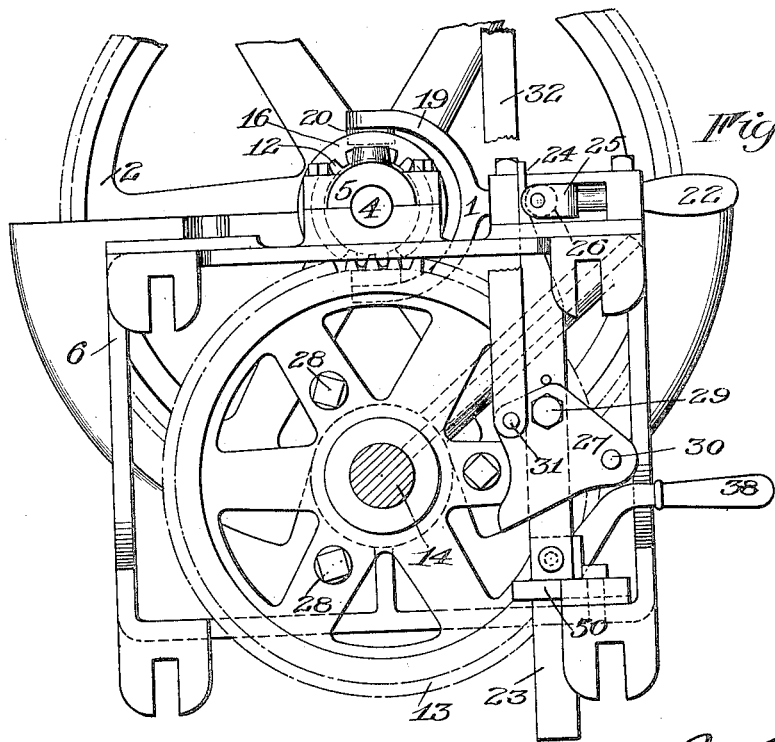

In the drawings: Figure 1 is a front view of a portion of a mangle showing the present invention applied thereto; Fig. 2 is a side-view of the front portion of the mangle with the improvements thereon; Fig. 3 is a horizontal section of the stop mechanism removed from the machine; Fig. 4 is an elevation of the inner side of the stop mechanism when the latter is detached from the mangle, the parts being shown in the positions which they occupy during the operation of the mangle; Fig. 5 is a detail view showing the positions of the parts during the stopping of the machine, and Figs. 6 and 7 are detail views showing the manner in which the motor is stopped.

In the present embodiment of the invention a shifter 1 is employed for breaking connection between a driving and a driven part. The driving part in this instance is in the form of a gear wheel 2, keyed at 3 to a shaft 4 which is journaled in bearings 5 upon a frame 6, the gear wheel being driven in any suitable manner as by a pinion 7 arranged on the shaft of a motor 8 which may be supported upon a bracket 9, bolted at 10 to the frame 6. The driven part is preferably in the form of a sleeve 11 surrounding the shaft 4 and having a pinion 12 at one end with which meshes a large gear 13 secured to the shaft 14 that is operatively connected to the machine to be driven, the latter, in this instance, being in the form of a mangle and indicated on the drawings by the letter A.

Preferably the shifter 1, which may be pivoted at 15 to the top of the frame 6, makes and breaks connection between the driving and the driven parts by means of a clutch consisting of an axially movable member 16 guided on the sleeve 11 by a key 16$^a$ and having clutch faces 17 adapted to coöperate with clutch faces 18 on the large gear 2. Connection between the shifter and the member 16 is established by having a yoke portion 19 on the shifter straddling the axially movable member 16 and provided with projections 20 traveling in an annular groove 21 in the said axially movable member. The shifter may be operated by a hand piece 22 which is rigidly secured thereto, and by mechanism controlled whenever an abnormal condition exists in the machine to be stopped. The latter may comprise a movable member 23 which in this instance is in the form of a vertically movable and gravity operated slide having a cam surface 24 thereon to coöperate with the shifter 1, the latter for this purpose having an arm 25 carrying a roller 26 with which cam surface 24 engages on an upward movement of the slide, thus causing the shifter to swing about its axis 15 and break connection between the driving and the driven parts. Preferably the slide 23 is actuated by the engagement of a dog 27 with one or more projections 28 on the gear wheel 13, the dog in this instance being pivoted at 29 to the slide and lying normally out of the path of the projections. An abutment or stop 30 on the dog may coöperate with the slide 23 to prevent the latter from moving too freely upon the slide.

The movement of the dog 27 into the path of the projections 28 is in this instance effected by a pull rod 32 pivoted at 31 to the dog and having its upper end operatively connected to the finger board 33 located at the intake of the mangle, the connection between the finger board and the rod being in the form of a pin 35 on the arm 36 extended from the shaft 37 of the finger board 33 and operating in a slot 34 in the rod. This pin and slot connection provides a lost motion connection between the dog 27 and the finger board and permits said dog to be released from the projections 28 without effecting the movement of the finger board, this release being accomplished preferably by pulling upwardly on the hand piece 38 which is extended from the slide 23. In addition to the finger board 33, there may be provided a finger board 39 located between the first and second rollers of the mangle and connected with the finger board 33 by a link 40. This additional finger board has been provided for the reason that it has been found that operatives will accidentally place their hands between the first and second rollers.

While the operation of the shifter will effect almost immediately the stoppage of a machine, it is desirable also to stop the motor, for the reason that the shifter may accidentally move again to establish connection between the driving and the driven parts. To this end the controlling member 41 of the controller 42 has a suitable means acting thereon, such as a spring 42ª, which tends to move the said controlling member to a position to stop the motor. The controlling member is held in the "on" position by an electro magnet 43 which preferably is in shunt with the line and to cause this magnet to release the controlling member in order that the latter may move to "off" position, a circuit 44 for short circuiting the magnet is provided and is controlled by spring finger contacts 45 which engage a contact 46 on the shaft of the finger board when the latter is moved by the engagement of the fingers or hand of the operative.

It will be noted that the frame 6 of the stop mechanism is separate from the mangle and it is held thereto by bolts 47, thus permitting the attachment and detachment of the stop mechanism. The stop mechanism is also adapted to be attached to either side of the machine and for this purpose is provided with an opening 48 permitting the position of the shifter 1 to be changed to the other side of the shaft 4, and also with an opening 49 on the same side of the shaft through which the slide 23 may be operated. The lower guide 50 of the slide 23 may also be transferred to the other side of the machine.

In operation, should the hand of the operative engage either finger board 33 or 39, the motion of the latter will pull upwardly on the rod 32 swinging the dog 27 from the position shown in Fig. 4 into the path of one of the projections 28 which pushes upwardly on the dog and causes an upward movement of the slide 23. The cam surface of the latter forces the shifter to turn about its axis 15 and thus break connection between the driving and the driven parts.

It is apparent that the shifter need not operate upon a clutch for breaking connection between a driven and a driving part, but that this result might be accomplished by other constructions. The cam face between the movable member and the shifter provides a very effective connection which is not liable to get out of order and which may be quickly assembled and the arrangement of the dog upon a slide secures greater durability and gives greater ease of action.

I claim as my invention:

1. A stop mechanism comprising a shifter for disconnecting a driven from a driving member, a movable member having a cam surface thereon coöperating with the shifter, a dog pivotally mounted on the movable member and adapted to be moved independently thereof, a member moving with the machine to be stopped, and means for moving the dog into connection with said member to effect the movement of the shifter.

2. The combination with a shifter for effecting disconnection between a driven and a driving member, of mechanism for effecting the movement of the shifter embodying a slide having a cam surface thereon coöperating with the shifter and a dog pivotally mounted on the slide and adapted to be moved independently thereof, a part moving with the machine to be stopped, and means for connecting said dog with the moving part to cause the latter to shift the slide.

3. The combination with a shifter for effecting disconnection between a driven and a driving member, of mechanism for effecting the movement of the shifter embodying a gravity controlled slide having a cam surface thereon coöperating with the shifter and a dog pivotally mounted on the slide and adapted to be moved independently thereof, a rotary member moving with the machine to be stopped having a projection thereon, and means for moving said dog into the path of the projection.

4. The combination with a shifter for effecting disconnection between a driven and a driving member, of mechanism for effecting the movement of the shifter embodying a member having a cam surface thereon coöperating with the shifter and a dog pivotally mounted on said member and adapted to be moved independently thereof, a member moving with the machine to be stopped, and a finger board having pivotal connection with the dog to move the latter into the path of the moving member.

5. The combination with a shifter for effecting disconnection between a driven and a driving member, of mechanism for effecting the movement of the shifter embodying a gravity controlled slide having a cam surface thereon coöperating with the shifter and a dog carried by the slide, a member moving with the machine to be stopped, a finger board, and a pull bar connected to the finger board, and pivotally connected to the dog to move the latter into the path of the moving member.

DANIEL M. COOPER

Witnesses:
ROBT. V. LLON,
H. G. STALLKNIGHT.